(12) United States Patent
Fume et al.

(10) Patent No.: US 10,614,265 B2
(45) Date of Patent: Apr. 7, 2020

(54) APPARATUS, METHOD, AND COMPUTER PROGRAM PRODUCT FOR CORRECTING SPEECH RECOGNITION ERROR

(71) Applicant: Kabushiki Kaisha Toshiba, Minato-ku, Tokyo (JP)

(72) Inventors: Kosei Fume, Kawasaki Kanagawa (JP); Taira Ashikawa, Kawasaki Kanagawa (JP); Masayuki Ashikawa, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 39 days.

(21) Appl. No.: 15/387,367

(22) Filed: Dec. 21, 2016

(65) Prior Publication Data

US 2017/0270086 A1    Sep. 21, 2017

(30) Foreign Application Priority Data

Mar. 16, 2016 (JP) .................................. 2016-052983

(51) Int. Cl.
*G06F 40/166* (2020.01)
*G06F 3/023* (2006.01)
(Continued)

(52) U.S. Cl.
CPC .......... *G06F 40/166* (2020.01); *G06F 3/0237* (2013.01); *G06F 3/0482* (2013.01);
(Continued)

(58) Field of Classification Search
CPC ............................. G06F 17/24; G06F 40/166
(Continued)

(56) References Cited

U.S. PATENT DOCUMENTS 7,444,286 B2   10/2008   Roth et al.
7,617,106 B2 * 11/2009   Schramm ................ G10L 13/00
                                         704/231
(Continued)

FOREIGN PATENT DOCUMENTS

JP        04-254896        9/1992
JP      2000-029492 A      1/2000
(Continued)

OTHER PUBLICATIONS

Haubold, Alexander, and John R. Kender. "Alignment of speech to highly imperfect text transcriptions." In 2007 IEEE International Conference on Multimedia and Expo, pp. 224-227. IEEE, 2007. (Year: 2007).*

(Continued)

*Primary Examiner* — Frank D Mills
(74) *Attorney, Agent, or Firm* — Knobbe, Martens, Olson & Bear, LLP

(57) ABSTRACT

An apparatus for correcting a character string in a text of an embodiment includes a first converter, a first output unit, a second converter, an estimation unit, and a second output unit. The first converter recognizes a first speech of a first speaker, and converts the first speech to a first text. The first output unit outputs a first caption image indicating the first text. The second converter recognizes a second speech of a second speaker for correcting a character string to be corrected in the first text, and converts the second speech to a second text. The estimation unit estimates the character string to be corrected, based on text matching between the first text and the second text. The second output unit outputs a second caption image indicating that the character string to be corrected is to be replaced with the second text.

11 Claims, 13 Drawing Sheets

(51) Int. Cl.
*G06F 3/0482* (2013.01)
*G06F 3/0488* (2013.01)
*G06F 3/16* (2006.01)
*G10L 15/26* (2006.01)
*G10L 25/51* (2013.01)

(52) U.S. Cl.
CPC ............ *G06F 3/0488* (2013.01); *G06F 3/167* (2013.01); *G10L 15/26* (2013.01); *G10L 25/51* (2013.01)

(58) Field of Classification Search
USPC ........................................................ 715/271
See application file for complete search history.

(56) References Cited

U.S. PATENT DOCUMENTS

| | | | | |
|---|---|---|---|---|
| 7,756,710 | B2* | 7/2010 | Franco | G10L 15/22 704/255 |
| 7,983,912 | B2 | 7/2011 | Hirakawa et al. | |
| 8,041,565 | B1* | 10/2011 | Bhardwaj | G10L 15/28 704/235 |
| 8,311,832 | B2 | 11/2012 | Miyamoto et al. | |
| 9,099,089 | B2 | 8/2015 | Dzik et al. | |
| 9,697,822 | B1* | 7/2017 | Naik | G10L 15/063 |
| 9,940,932 | B2* | 4/2018 | Ramachandra | G10L 15/265 |
| 10,276,150 | B2* | 4/2019 | Fume | G06F 3/04842 |
| 2003/0189603 | A1* | 10/2003 | Goyal | G06F 17/273 715/863 |
| 2007/0027686 | A1* | 2/2007 | Schramm | G10L 13/00 704/235 |
| 2007/0033037 | A1* | 2/2007 | Mowatt | G10L 15/22 704/251 |
| 2009/0319265 | A1* | 12/2009 | Wittenstein | G10L 21/04 704/234 |
| 2011/0153620 | A1* | 6/2011 | Coifman | G10L 15/065 707/748 |
| 2014/0039887 | A1* | 2/2014 | Dzik | G10L 15/26 704/235 |
| 2014/0229165 | A1* | 8/2014 | Lee | G06F 17/24 704/9 |

FOREIGN PATENT DOCUMENTS

| | | |
|---|---|---|
| JP | 2001-060192 | 3/2001 |
| JP | 2002-287792 A | 10/2002 |
| JP | 2004-151614 A | 5/2004 |
| JP | 2004-207821 A | 7/2004 |
| JP | 2004-334133 A | 11/2004 |
| JP | 2006-211636 A | 8/2006 |
| JP | 2007-093789 A | 4/2007 |
| JP | 2008-051895 A | 3/2008 |
| JP | 2008-210500 A | 9/2008 |
| JP | 2015-056154 A | 3/2015 |
| JP | 2015-531915 A | 11/2015 |

OTHER PUBLICATIONS

Nagatsuma, R., et al., "Effective Captioning Method by Using Crowd-Sourcing Approach", IEICE Technical Report, WIT2012-25 (Dec. 2012), 17 pgs. Copyright 2012.

* cited by examiner

APPARATUS, METHOD, AND COMPUTER PROGRAM PRODUCT FOR CORRECTING SPEECH RECOGNITION ERROR

CROSS-REFERENCE TO RELATED APPLICATIONS

This application is based upon and claims the benefit of priority from Japanese Patent Application No. 2016-052983, filed on Mar. 16, 2016; the entire contents of which are incorporated herein by reference.

FIELD

Embodiments described herein relate generally to an apparatus, a method, and a computer program product for correcting speech recognition error.

BACKGROUND

A conventional technology of converting speech uttered by a speaker to a text in a speech recognition process, and outputting the converted text as a caption has been known.

In the technology as described above, for correcting a recognition error in the speech recognition process, a technology of outputting a caption in which a character string of a recognition error portion is corrected into a correct character string has been known. This is possible because a corrector manually selects the recognition error portion on the text that is converted from speech, and manually inputs the correct character string for correcting the character string of the selected recognition error portion from a keyboard, for example.

However, in the conventional technology as described above, to correct the recognition error, the recognition error portion needs to be manually selected and the character string in the recognition error portion needs to be manually corrected. Thus, the correction of the recognition error has been troublesome.

DETAILED DESCRIPTION

According to one embodiment, an apparatus for correcting a character string in a text includes a first acquisition unit, a first converter, a first output unit, a second acquisition unit, a second converter, an estimation unit, and a second output unit. The first acquisition unit acquires a first audio of a first speech of a first speaker. The first converter converts the first audio to a first text. The first output unit outputs a first caption image of the first text; The second acquisition unit acquires a second audio of a second speech of a second speaker for correcting a character string that is included in the first text. The second converter converts the second audio to a second text. The estimation unit estimates the character string to be corrected based at least in part on text matching between the first text and the second text. The second output unit outputs a second caption image indicating that the character string to be corrected is to be replaced with the second text.

Hereinafter, embodiments will be described in detail with reference to the accompanying drawings.

First Embodiment

Figure 1:
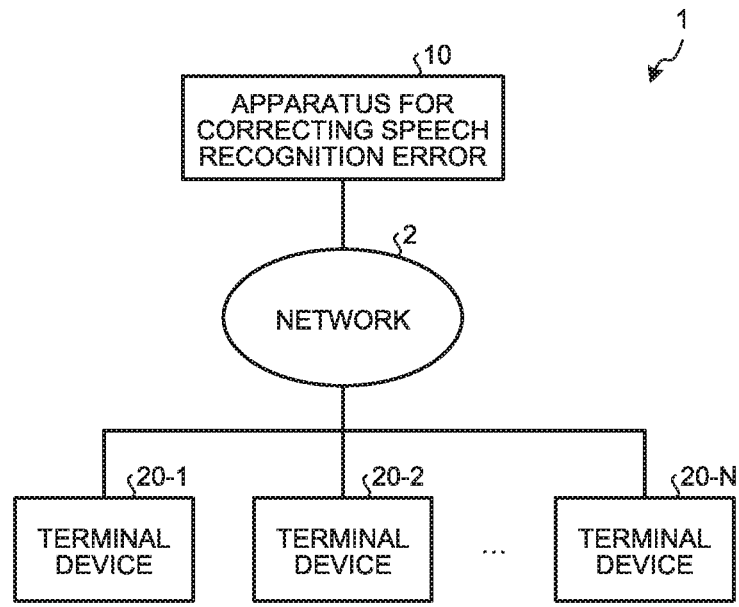
FIG. 1 is a configuration diagram illustrating an example of a system for correcting speech recognition error of a first embodiment.

FIG. 1 is a configuration diagram illustrating an example of a system for correcting speech recognition error 1 of a first embodiment. As illustrated in FIG. 1, the system for correcting speech recognition error 1 includes an apparatus for correcting speech recognition error 10, and terminal devices 20-1 to 20-N.

The apparatus for correcting speech recognition error 10 and the terminal devices 20-1 to 20-N (N is a natural number of three or more) are connected via a network 2. For example, the network 2 can be implemented using, for example, a local area network (LAN) or the Internet. The network 2 may also be a wired network or a wireless network.

In the following explanation, if the terminal devices 20-1 to 20-N need not be differentiated, each of the terminal devices 20-1 to 20-N may be simply referred to as a terminal device 20.

The apparatus for correcting speech recognition error 10 may be implemented using, for example, a computer such as a speech recognition server device. The terminal device 20 is a computer including a microphone that functions as a speech input device, a touch panel display that functions as an operation device and a display device, and the like. The terminal device 20 may be implemented using a smartphone, a tablet terminal, and a laptop personal computer (PC), for example.

In the first embodiment, the system for correcting speech recognition error 1 is a system that displays the content of talk such as a lecture or a seminar as a caption in real time. However, it is not limited thereto. For example, the system for correcting speech recognition error 1 is applicable to a system that displays the spoken content of the conference and the like as a caption in real time.

In the following example, a lecturer (an example of a first speaker) uses the terminal device 20-1, a corrector (an example of a second speaker) who corrects the caption of the content of talk uses the terminal device 20-2, and an audience who is listening to the talk uses the terminal device 20-N. However, it is not limited thereto. In the first embodiment, it is assumed that the audience who uses the terminal device 20-N is a person with hearing impairments who has difficulty in hearing. However, it is not limited thereto.

In the first embodiment, the system for correcting speech recognition error 1 will be used as follows.

First, the lecturer vocally inputs a first speech that is the content of talk into the terminal device 20-1 through a microphone, and the terminal device 20-1 transmits the first speech that is vocally input, to the apparatus for correcting speech recognition error 10. The apparatus for correcting speech recognition error 10 recognizes the first speech that is received from the terminal device 20-1, converts the first speech to a first text, and distributes a first caption image indicating the converted first text to each of the terminal devices 20-1 to 20-N. Each of the terminal devices 20 displays the first caption image that is received from the apparatus for correcting speech recognition error 10, on a touch panel display.

Next, the corrector confirms the first caption image on the terminal device 20-2, and if there is a recognition error on the first text, the corrector vocally inputs (re-speaks) a second speech that has a correct content and that is used for correcting the recognition error, into the terminal device 20-2 through a microphone. The terminal device 20-2 then transmits the second speech that is vocally input to the apparatus for correcting speech recognition error 10. The apparatus for correcting speech recognition error 10 recognizes the second speech that is received from the terminal device 20-2 and converts the second speech to a second text. The apparatus for correcting speech recognition error 10 then distributes a second caption image for replacing a character string to be corrected of a recognition error portion in the first text with the second text, to each of the terminal devices 20-1 to 20-N. Each of the terminal devices 20 displays the second caption image that is received from the apparatus for correcting speech recognition error 10 on the touch panel display.

In this manner, in the first embodiment, if the first text that is indicated on the first caption image includes a recognition error, the second caption image in which the recognition error is corrected is distributed to each of the terminal devices 20. Thus, the audience can correctly understand the content of the talk by the caption image.

Figure 2:
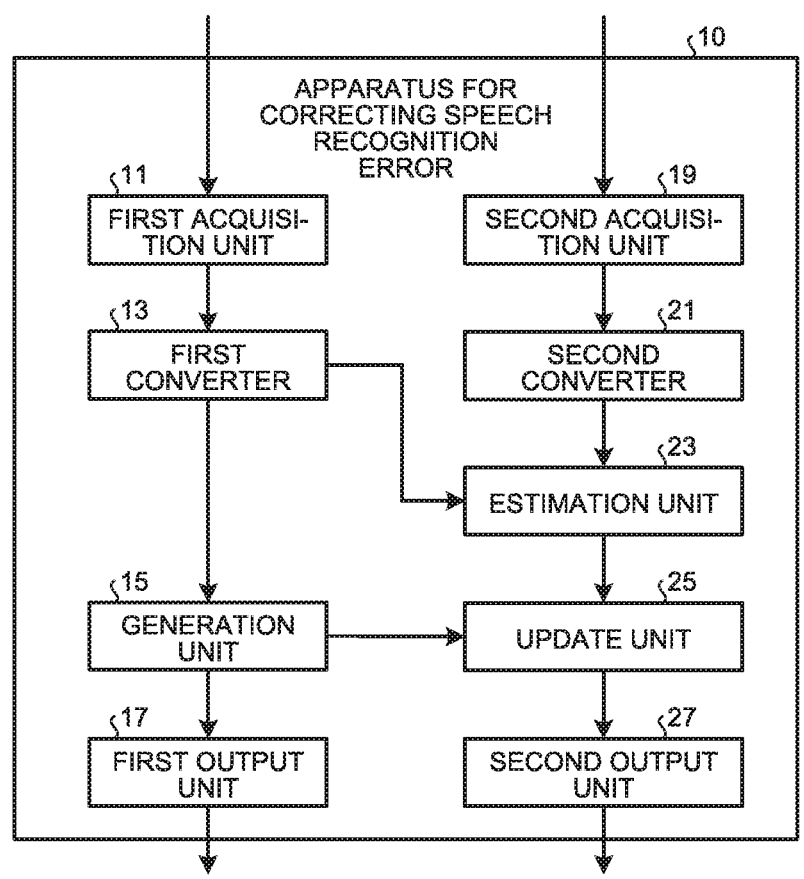
FIG. 2 is a configuration diagram illustrating an example of an apparatus for correcting speech recognition error of the first embodiment.

FIG. 2 is a configuration diagram illustrating an example of the apparatus for correcting speech recognition error 10 of the first embodiment. As illustrated in FIG. 2, the apparatus for correcting speech recognition error 10 includes a first acquisition unit 11, a first converter 13, a generation unit 15, a first output unit 17, a second acquisition unit 19, a second converter 21, an estimation unit 23, an update unit 25, and a second output unit 27.

The first acquisition unit 11, the first converter 13, the generation unit 15, the first output unit 17, the second acquisition unit 19, the second converter 21, the estimation unit 23, the update unit 25, and the second output unit 27 may be implemented by causing a processing device such as a central processing unit (CPU) to execute computer programs, that is, by software, by hardware such as an integrated circuit (IC), or by a combination of software and hardware.

The first acquisition unit 11 acquires the first speech of the first speaker. In the first embodiment, as described above, the first acquisition unit 11 acquires the spoken content of the talk by the lecturer from the terminal device 20-1, as the first speech of the first speaker.

The first converter 13 recognizes the first speech that is acquired by the first acquisition unit 11, and converts the first speech to a first text. More specifically, the first converter 13 recognizes the first speech that is acquired by the first acquisition unit 11 in a speech recognition process, and converts the content of the first speech to the first text. Known technologies may be used for the speech recognition process.

The generation unit 15 generates the first caption image indicating the first text that is converted by the first converter 13. The first caption image may be any image as long as the image indicates the first text.

For example, the first caption image may be an image in which the font size or the background color of the first text is changed so that the users such as the lecturer, the corrector, and the audience can view easily. Such an image includes the first text in white characters on a black background that is often used for a sub-display for what is called information accessibility for people with disabilities. In general, for those with hearing impairments, a display mode of white characters on a black background, 20 characters wide, 10 lines in height, and the like is known.

For example, the first caption image also includes the first text being displayed on any video such as a video of the lecturer in an overlay manner, an image of the first text being displayed so as to be edited by the corrector, and the like.

However, the first caption image is not limited thereto.

Figure 3:
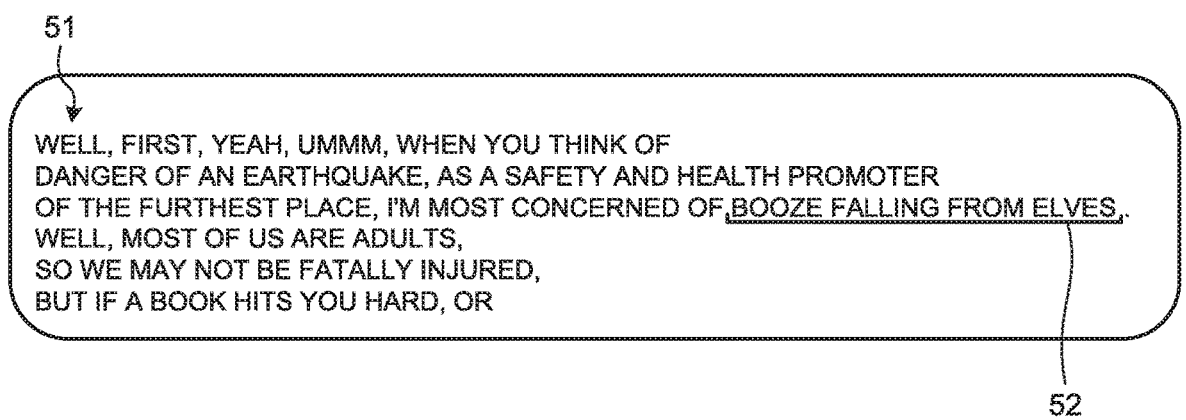
FIG. 3 is a diagram illustrating an example of a first caption image of the first embodiment.

FIG. 3 is a diagram illustrating an example of a first caption image of the first embodiment. In the example illustrated in FIG. 3, a first text 51 is displayed on the first caption image. A recognition error has occurred on the first text 51 during the speech recognition process, and the first text 51 also includes a character string to be corrected 52, which will be described below.

The first output unit 17 outputs the first caption image that is generated by the generation unit 15. In the first embodiment, the first output unit 17 outputs the first caption image to each of the terminal devices 20.

In this manner, the first caption image is displayed on each of the terminal devices 20. In this example, it is assumed that the corrector confirms the first caption image on the terminal device 20-2, and confirms that the first text includes a recognition error. For example, if the first caption image is an image illustrated in FIG. 3, the corrector confirms that the character string to be corrected 52 is the recognition error portion.

In this case, the second acquisition unit 19 acquires the second speech of the second speaker for correcting the character string to be corrected that is included in the first text. In the first embodiment, as described above, the second acquisition unit 19 acquires the speech of the corrector for correcting the character string to be corrected from the terminal device 20-2, as the second speech of the second speaker.

The second converter 21 recognizes the second speech that is acquired by the second acquisition unit 19, and converts the second speech to a second text. More specifically, the second converter 21 recognizes the second speech that is acquired by the second acquisition unit 19 in the speech recognition process, and converts the content of the second speech to the second text. Similar to the first converter 13, known technologies may be used for the speech recognition process.

Figure 4:
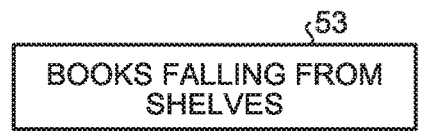
FIG. 4 is a diagram illustrating an example of a second text of the first embodiment.

FIG. 4 is a diagram illustrating an example of the second text of the first embodiment. The example in FIG. 4 illustrates a second text 53 for correcting the character string to be corrected 52 illustrated in FIG. 3.

The estimation unit 23 performs text matching (text base matching) between the first text that is converted by the first converter 13 and the second text that is converted by the second converter 21, and estimates the character string to be corrected in the first text, based on the result of the text matching. More specifically, the estimation unit 23 further performs acoustic matching (acoustic data matching) between the first speech that is to be converted to the first text by the first converter 13 and the second speech that is to be converted to the second text by the second converter 21, and estimates the character string to be corrected in the first text, based on the result of the text matching and the result of the acoustic matching.

In the first embodiment, the estimation unit 23 performs text matching between the first text and the second text as follows.

First, the estimation unit 23 performs a morphological analysis process and a reading estimation process on the first text and the second text, respectively, and acquires morphological information and reading information from the first text and the second text, respectively. The reading estimation process is a process of correcting the text into a solid state. For example, in Japanese, kanji characters are corrected to hiragana characters or katakana characters.

Next, by using the morphological information and the reading information of the first text, the estimation unit 23 expands the first text to each of the values of a surface character, a combination of morphemes (parts of speech), and a read character string. By using the morphological information and the reading information of the second text, the estimation unit 23 also expands the second text to each of the values of a surface character, a combination of morphemes (parts of speech), and a read character string.

Next, the estimation unit 23 scans the second text with respect to the first text on a character string (surface character) basis, a morpheme basis, and a reading basis, respectively, and searches a character string (similar block) that matches with or is close to the second text, in the first text.

Upon detecting the similar block, the estimation unit 23 calculates similarity of the similar block with the second text, on a character string (surface character) basis, a morpheme basis, and a reading basis, respectively. The estimation unit 23 then integrates the calculated similarities, and sets the integrated similarity as text similarity. For example, formula (1) can be used to integrate the similarities.

$$\text{TextSim}(a,b) = \text{Sim}\_S(a,b) + \text{Sim}\_M(a,b) + \text{Sim}\_R(a,b) \quad (1)$$

In this example, a is the second text, and b is the similar block in the first text. Sim_S(a, b) is the similarity between a and b on a character string (surface character) basis. Sim_M(a, b) is the similarity between a and b on a morpheme basis. Sim_R(a, b) is the similarity between a and b on a reading basis. TextSim(a, b) indicates the text similarity.

In the first embodiment, the estimation unit 23 performs acoustic matching between the first speech and the second speech, and calculates acoustic similarity using known technologies such as a voice trigger. The voice trigger recognizes a matching position of the speeches, using acoustic information such as speech waveforms. The estimation unit 23 performs the acoustic matching between the first speech and the second speech, by shifting a comparison section (section of the first speech that is compared with the second speech) of the first speech, and calculates the acoustic degree of each comparison section.

The estimation unit 23 estimates the character string in which the similarity with the second text is equal to or more than a threshold, among the character strings included in the first text, as the character string to be corrected, based on the text matching result and the acoustic matching result.

More specifically, the estimation unit 23 integrates the text similarity and the acoustic similarity of the comparison section that corresponds to the similar block of the text similarity, for each of the calculated text similarity, and sets the integrated similarity as estimated similarity. For example, formula (2) can be used to integrate. The text similarity and the acoustic similarity.

$$\text{MergeSim}(a,b) = \text{TextSim}(a,b) + \text{VoiceSim}(a',b') \quad (2)$$

In this example, a' is the second speech, and b' is the comparison section in the first speech that corresponds to the similar block. VoiceSim (a', b') is the acoustic similarity between a' and b'. MergeSim(a, b) is the estimated similarity.

For example, the estimation unit 23 estimates the character string in the similar block in which the estimated similarity is equal to or more than a threshold, as the character string to be corrected. In the first embodiment, it is assumed that there is a single similar block in which the estimated similarity is equal to or more than the threshold.

When the first text is the first text 51 illustrated in FIG. 3, and the second text is the second text 53 illustrated in FIG. 4, the estimation unit 23 estimates the character string to be corrected 52 from the first text 51, by estimating the character string to be corrected in this manner.

The update unit 25 updates the first caption image that is generated by the generation unit 15, to the second caption image indicating that the character string to be corrected in the first text is to be replaced with the second text.

Figure 5:
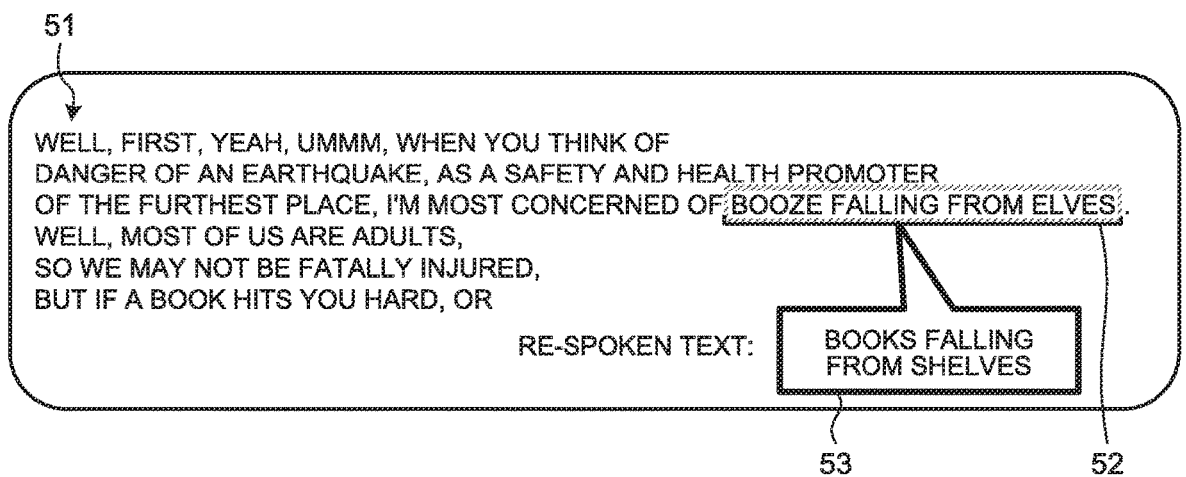
FIG. 5 is a diagram illustrating an example of a second caption image of the first embodiment.

FIG. 5 is a diagram illustrating an example of the second caption image of the first embodiment. In the example illustrated in FIG. 5, the first text 51 is displayed on the second caption image. Furthermore, in the example illustrated in FIG. 5, the character string to be corrected 52 in the first text 51 is displayed with highlight. Furthermore, in the example illustrated in FIG. 5, the second text 53 is displayed as a text being re-spoken, and is indicating that the character string to be corrected 52 is to be replaced with the second text 53.

However, the display mode of the second caption image is not limited thereto, and for example, the character string to be corrected 52 may be replaced with the second text 53 in advance, or the character string to be corrected 52 may be replaced with the second text 53 after displaying the display as illustrated in FIG. 5 for a certain period of time.

The second output unit 27 outputs the second caption image that is updated by the update unit 25. In the first embodiment, the second output unit 27 outputs the second caption image to each of the terminal devices 20.

In this manner, the second caption image is displayed on each of the terminal devices 20. Consequently, in the first embodiment, if there is a recognition error in the first text indicated by the first caption image, the second caption image in which the recognition error is corrected, is distributed to each of the terminal devices 20. Thus, the audience can correctly understand the content of the talk from the caption image.

Figure 6:
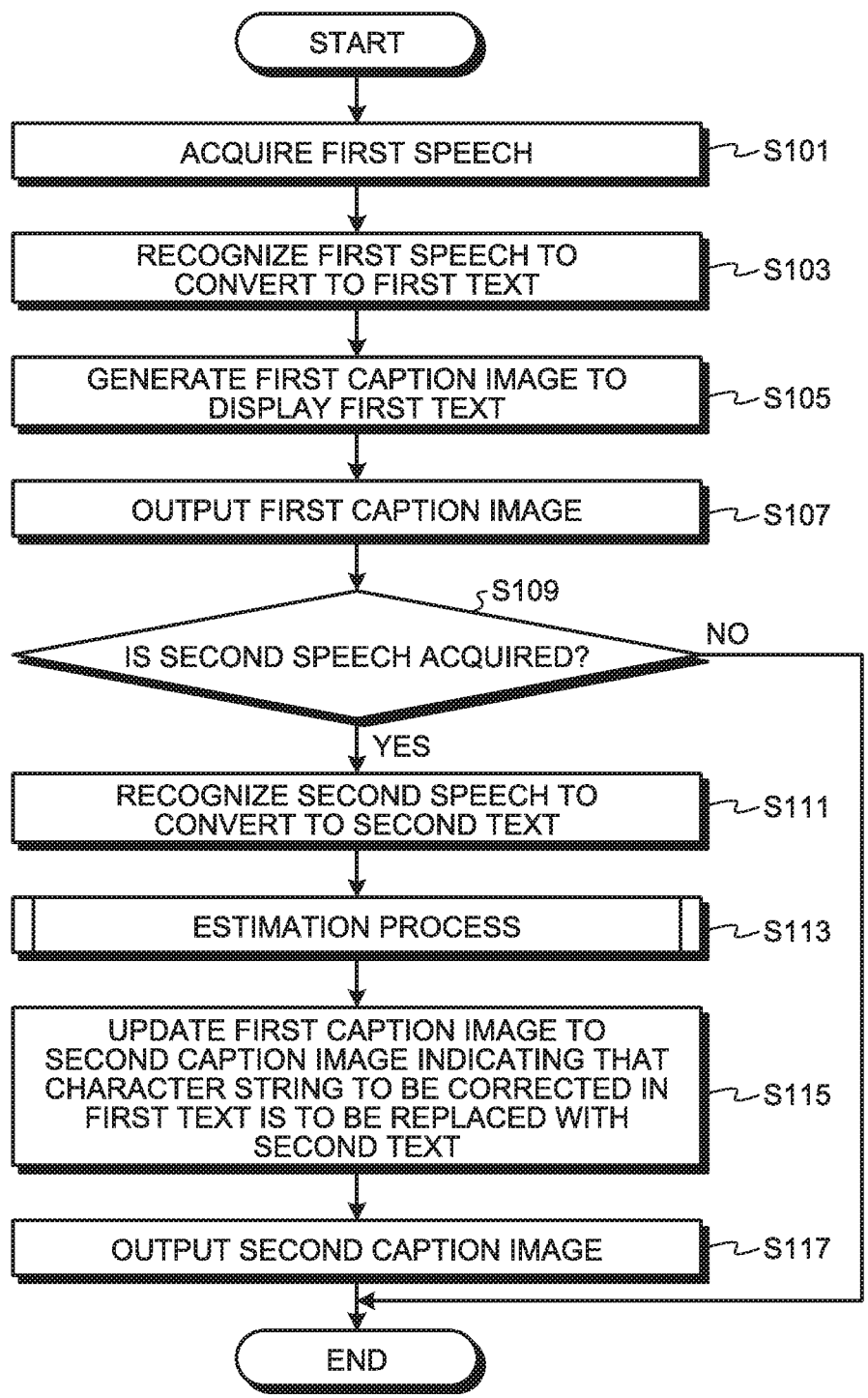
FIG. 6 is a flowchart illustrating a process example of the first embodiment.

FIG. 6 is a flowchart illustrating an example of a processing flow performed by the apparatus for correcting speech recognition error 10 of the first embodiment.

First, the first acquisition unit 11 acquires the spoken content of the talk by the lecturer, as the first speech of the first speaker, from the terminal device 20-1 (step S101).

Next, the first converter 13 recognizes the first speech that is acquired by the first acquisition unit 11 in the speech recognition process, and converts the content of the first speech to the first text (step S103).

The generation unit 15 then generates the first caption image indicating the first text that is converted by the first converter 13 (step S105).

The first output unit 17 then outputs the first caption image that is generated by the generation unit 15, to each of the terminal devices 20 (step S107).

When the second acquisition unit 19 acquires the speech of the corrector for correcting the character string to be corrected, as the second speech of the second speaker from the terminal device 20-2 (Yes at step S109), the second converter 21 recognizes the second speech that is acquired by the second acquisition unit 19 in the speech recognition process, and converts the content of the second speech to the second text (step S111).

The estimation unit 23 then performs the estimation process for estimating the character string to be corrected in the first text (step S113). The details of the estimation process will be described below.

The update unit 25 then updates the first caption image that is generated by the generation unit 15 to the second caption image indicating that the character string to be corrected in the first text is to be replaced with the second text (step S115).

The second output unit 27 then outputs the second caption image that is updated by the update unit 25 to each of the terminal devices 20 (step S117).

If the second acquisition unit 19 does not acquire the second speech of the second speaker from the terminal device 20-2 (No at step S109), the processes subsequent to step S111 will not be performed.

Figure 7:
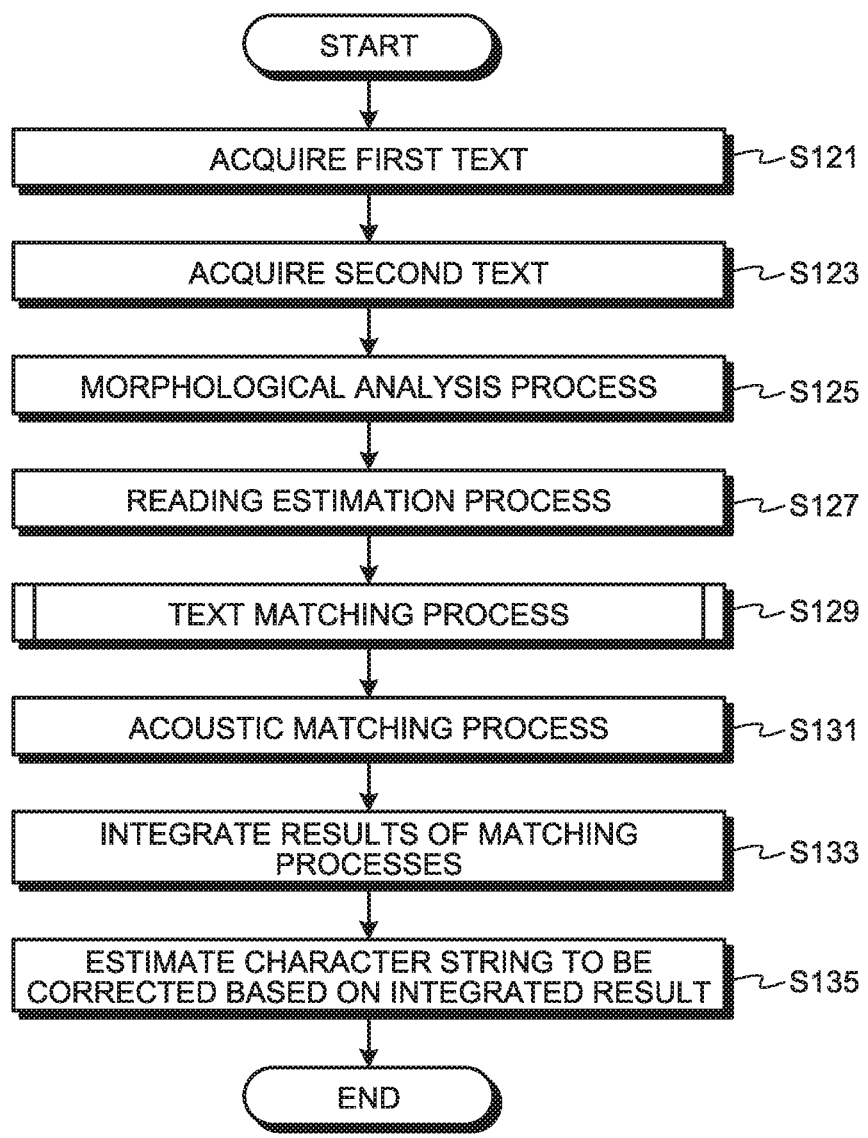
FIG. 7 is a flowchart illustrating an example of an estimation process of the first embodiment.

FIG. 7 is a flowchart illustrating an example of a flow of an estimation process at step 3113 in the flowchart illustrated in FIG. 6.

First, the estimation unit 23 acquires the first text from the first converter 13 (step S121). The estimation unit 23 may also acquire the first text from the generation unit 15.

Next, the estimation unit 23 acquires the second text from the second converter 21 (step S123).

The estimation unit 23 then performs the morphological analysis process on the first text and the second text, respectively, and acquires morphological information from the first text and the second text, respectively (step S125).

The estimation unit 23 then performs the reading estimation process on the first text and the second text, respectively, and acquires reading information from the first text and the second text, respectively (step S127).

The estimation unit 23 then performs the text matching process between the first text and the second text, using the morphological information and the reading information of the first text, as well as the morphological information and the reading information of the second text (step S129).

Figure 8:
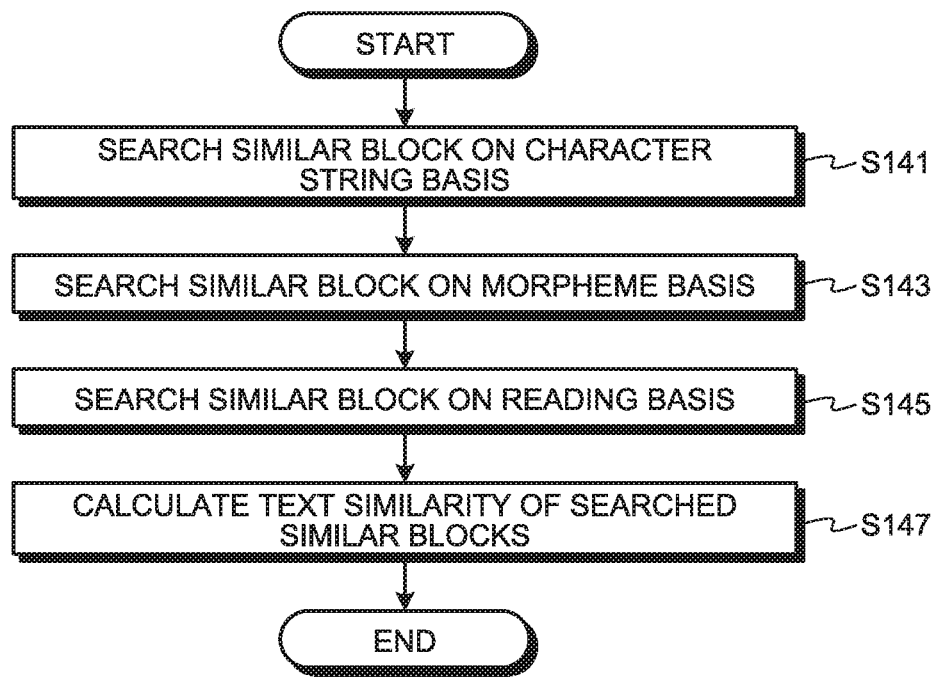
FIG. 8 is a flowchart illustrating an example of a text matching process of the first embodiment.

With reference to FIG. 8, the text matching process will now be described. FIG. 8 is a flowchart illustrating an example of the text matching process at step S129 in the flowchart illustrated in FIG. 7.

First, the estimation unit 23 expands the first text to each of the values of a surface character, a combination of morphemes (parts of speech), and a read character string, using the morphological information and the reading information of the first text. The estimation unit 23 also expands the second text to each of the values of a surface character, a combination of morphemes (parts of speech), and a read character string, using the morphological information and the reading information of the second text.

The estimation unit 23 then scans the second text with respect to the first text on a character string (surface character) basis, and searches the character string (similar block) that matches with or is close to the second text, in the first text (step S141).

The estimation unit 23 then scans the second text with respect to the first text on a morpheme basis, and searches the character string (similar block) that matches with or is close to the second text, in the first text (step S143).

The estimation unit 23 then scans the second text with respect to the first text on a reading basis, and searches the character string (similar block) that matches with or is close to the second text, in the first text (step S145).

The estimation unit 23 then calculates the similarity in the similar block with the second text on a character string (surface character) basis, a morpheme basis, and a reading basis, for each of the similar block being searched. The estimation unit 23 then calculates the text similarity, by integrating the calculated similarities (step S147).

Returning to FIG. 7, the estimation unit 23 acquires the first speech from the first converter 13 as well as the second speech from the second converter 21, and performs an acoustic matching process (step S131). More specifically, the estimation unit 23 performs the acoustic matching between the first speech and the second speech, by shifting the comparison section (section of the first speech that is compared with the second speech) of the first speech, and calculates the acoustic similarity at each comparison section.

The estimation unit 23 then integrates the text similarity and the acoustic similarity in the comparison section that corresponds to the similar block of the text similarity, for each of the calculated text similarity. The estimation unit 23 then integrates the results of the text matching process and the acoustic matching process, and sets the integrated similarity as the estimated similarity (step S133).

The estimation unit 23 then estimates the character string to be corrected in the first text, based on the estimated similarity that is the integrated result (step S135). For example, the estimation unit 23 estimates the character string in the similar block in which the estimated similarity is equal to or more than the threshold, as the character string to be corrected.

As described above, in the first embodiment, the recognition error, which occurs when the uttered speech of the speaker is recognized and output as a caption, can be corrected by just repeating (re-speaking) the correct content for correcting the recognition error. Thus, it is possible to simplify the recognition error correction, thereby reducing the trouble and cost of the operation.

In the method of the first embodiment, linguistic features and acoustic features are used to automatically estimate the recognition error portion, by the text matching and the acoustic matching. Thus, it is possible to omit the manual input for selecting the recognition error portion and for collecting the character string in the recognition error portion.

In particular, in the method of the first embodiment, the text matching is performed on a character string (surface character) basis, a morpheme basis, and a reading basis, respectively. Thus, it is possible to estimate the (range of) character string to be corrected using various bases instead of a fixed basis.

Figure 9:
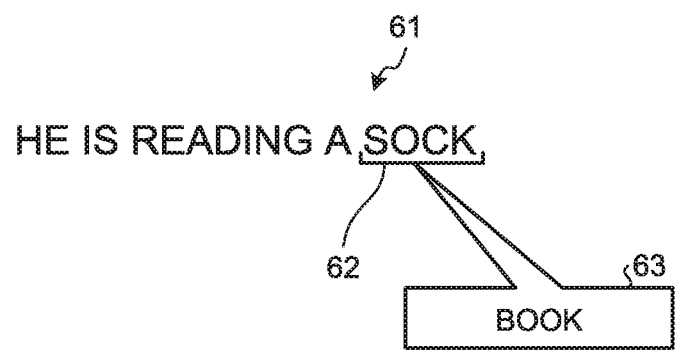
FIG. 9 is an explanatory diagram of an estimation example of a range of a character string to be corrected in the first embodiment.

For example, in the example illustrated in FIG. 9, a second text 63 is a noun. Thus, a character string to be corrected 62 that is equivalent to the noun is estimated from a first text 61, and the (range of) character string to be corrected can be estimated by the appearance similarity of the part of speech.

Figure 10:
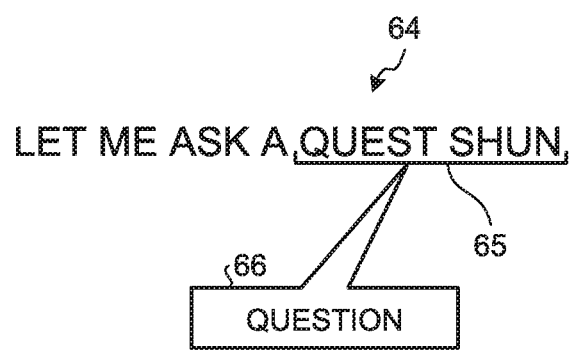
FIG. 10 is an explanatory diagram of an estimation example of a range of a character string to be corrected in the first embodiment.

Furthermore, for example, in the example illustrated in FIG. 10, a character string to be corrected 65 is estimated from a first text 64 relative to a second text 66. Thus, the (range of) character string to be corrected can be estimated by the similarity of the read character string on a morpheme basis.

Figure 11:
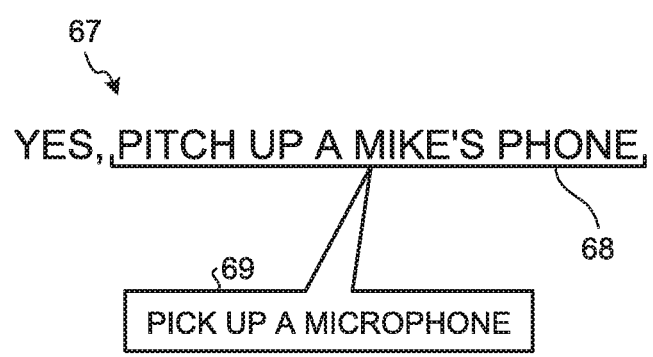
FIG. 11 is an explanatory diagram of an estimation example of a range of a character string to be corrected in the first embodiment.

Furthermore, for example, in the example illustrated in FIG. 11, a character string to be corrected 68 is estimated from the first text 67 relative to the second text 69. Thus, the (range of) character string to be corrected can be estimated by the distance of the character string and the similarity of the content of the part of speech that is included in the character string.

In this manner, in the method of the first example, the recognition error portion need not be manually selected or the character string in the recognition error portion need not be manually corrected. Thus, the recognition error can be corrected not only by a corrector with a certain skill, but also be corrected by a person who has no certain skill.

Consequently, even in a situation in which the information accessibility for people with disabilities has been guaranteed only in a special conference, talk, lecture, or the like, many people can easily support the information accessibility, thus enabling the accuracy of caption to improve.

Second Embodiment

In a second embodiment, a case in which the first text includes a plurality of character strings that are candidates to be replaced with the second text is described. In the following, the difference between the first embodiment and the second embodiment is mainly described, and the same names and reference numerals are used to designate the components that have the same function as that of the first embodiment, and the description thereof will be omitted.

Figure 12:
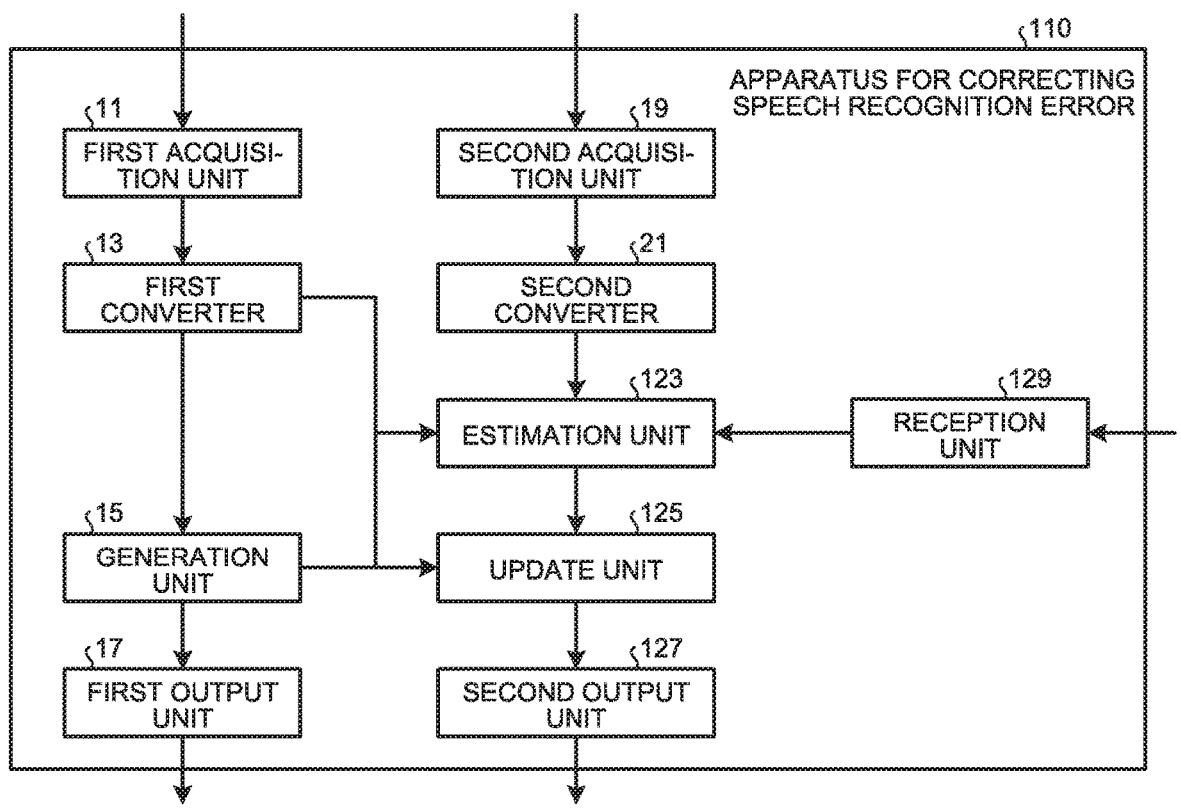
FIG. 12 is a configuration diagram illustrating an example of an apparatus for correcting speech recognition error of a second embodiment.

FIG. 12 is a configuration diagram illustrating an example of an apparatus for correcting speech recognition error 110 of the second embodiment. As illustrated in FIG. 12, the apparatus for correcting speech recognition error 110 is different from the first embodiment in including an estimation unit 123, an update unit 125, a second output unit 127, and a reception unit 129.

The reception unit 129 may be implemented by causing a processing device such as the CPU to execute computer programs, that is, by software, by hardware such as the IC, or by a combination of software and hardware.

When the first text that is converted by the first converter 13 includes a plurality of character strings in which the similarity with the second text that is converted by the second converter 21 is equal to or more than a threshold, the estimation unit 123 estimates each of the character strings as a candidate character string to be corrected.

The update unit 125 updates the first caption image that is generated by the generation unit 15, to a selection image for causing the corrector to select a candidate character string to be corrected that is to be replaced with the second text, from the candidate character strings to be corrected in the first text.

Figure 13:
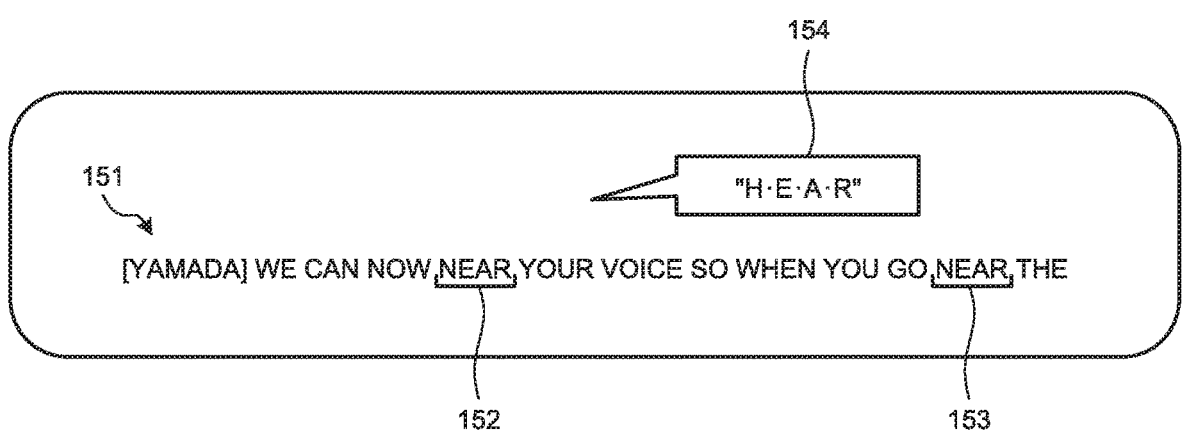
FIG. 13 is a diagram illustrating an example of a selection image of the second embodiment.

FIG. 13 is a diagram illustrating an example of the selection image of the second embodiment. In the example illustrated in FIG. 13, a first text 151 is displayed on the selection image. Furthermore, in the example illustrated in FIG. 13, a second text 154 is displayed as a text being re-spoken. Furthermore, the example illustrated in FIG. 13 includes candidate character strings to be corrected 152 and 153 that are candidates to be replaced with the second text 154. The candidate character strings to be corrected 152 and 153 may be displayed with highlight.

The second output unit 127 outputs the selection image that is updated by the update unit 125. In the second embodiment, the second output unit 127 outputs the selection image to the terminal device 20-2 that is used by the corrector.

The reception unit 129 receives selection input for selecting the candidate character string to be corrected that is to be replaced with the second text, on the selection screen. In the second embodiment, the reception unit 129 receives, from the terminal device 20-2, input (input of position coordinates at the position touched on the selection image) of touching the position on the candidate character string to be corrected or the vicinity position of the candidate character string to be corrected that is to be replaced with the second text, on the selection image.

Figure 14:
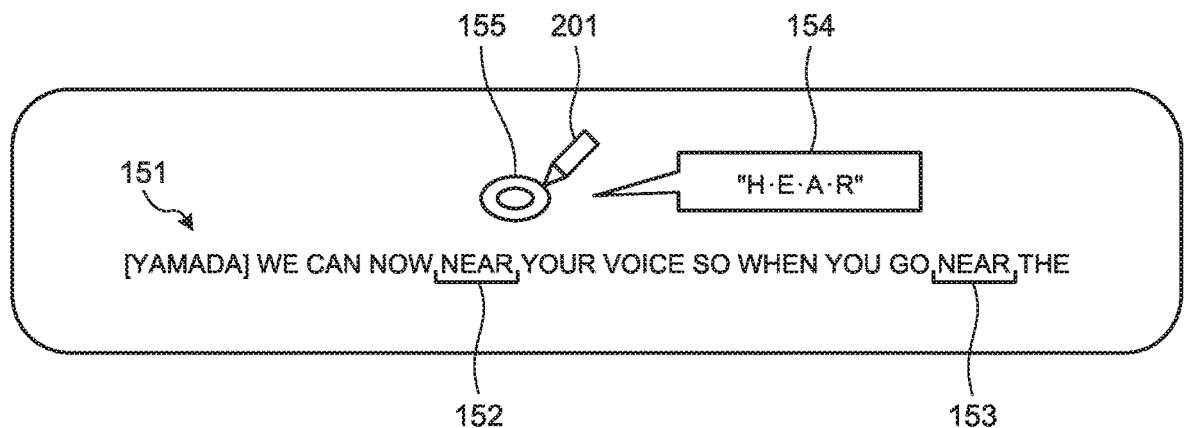
FIG. 14 is an explanatory diagram of an example of selection input of the second embodiment.

For example, as illustrated in FIG. 14, the reception unit 129 receives input of touching (pointing or tapping) by the corrector a vicinity position 155 of the candidate character string to be corrected 152 on the selection image using a touch pen 201, for example.

The estimation unit 123 estimates the candidate character string to be corrected that is selected by the selection input being received by the reception unit 129, among the candidate character strings to be corrected, as the character string to be corrected. In the second embodiment, the estimation unit 123 estimates the candidate character string to be corrected that is closer to the position having been touched by the selection input, among the candidate character strings to be corrected, as the character string to be corrected. For example, formula (3) may be used to calculate a score corresponding to the distance between the candidate character string to be corrected and the position touched by the selection input. Thus, by using the score, it is possible to specify the candidate character string to be corrected that is closer to the position having been touched by the selection input, among the candidate character strings to be corrected.

$$\text{Score}(x) = 1(\text{sqrt}(2pi))\exp(-x^2/2) \quad (3)$$

The value x is as illustrated in formula (4).

$$x = \text{distance } (px) \text{ from the position pointed to the candidate character string to be corrected/font size of the candidate character string to be corrected } (px) \quad (4)$$

Thus, in the example illustrated in FIG. 14, the vicinity position 155 is closer to the candidate character string to be corrected 152 than the candidate character string to be corrected 153. Thus, the estimation unit 123 estimates the candidate character string to be corrected 152 as the character string to be corrected.

The update unit 125 updates the selection image to the second caption image indicating that the character string to be corrected in the first text is to be replaced with the second text.

Figure 15:
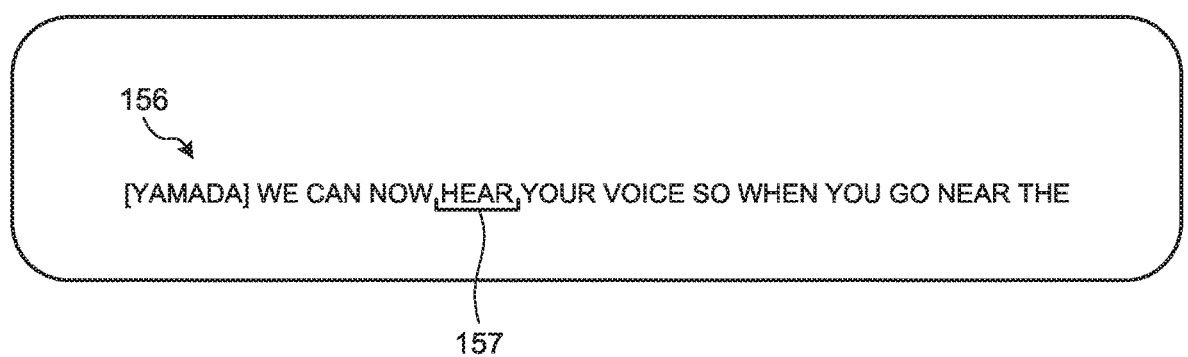
FIG. 15 is a diagram illustrating an example of a second caption image of the second embodiment.

FIG. 15 is a diagram illustrating an example of the second caption image of the second embodiment. In the example illustrated in FIG. 15, a first text 156 in which the candidate character string to be corrected 152 that is included in the first text 151 is replaced with a second text 157 in which the second text 154 is converted to kanji (Chinese character).

The second output unit 127 outputs the second caption image that is updated by the update unit 125. In the second embodiment, the second output unit 127 outputs the second caption image to each of the terminal devices 20.

Figure 16:
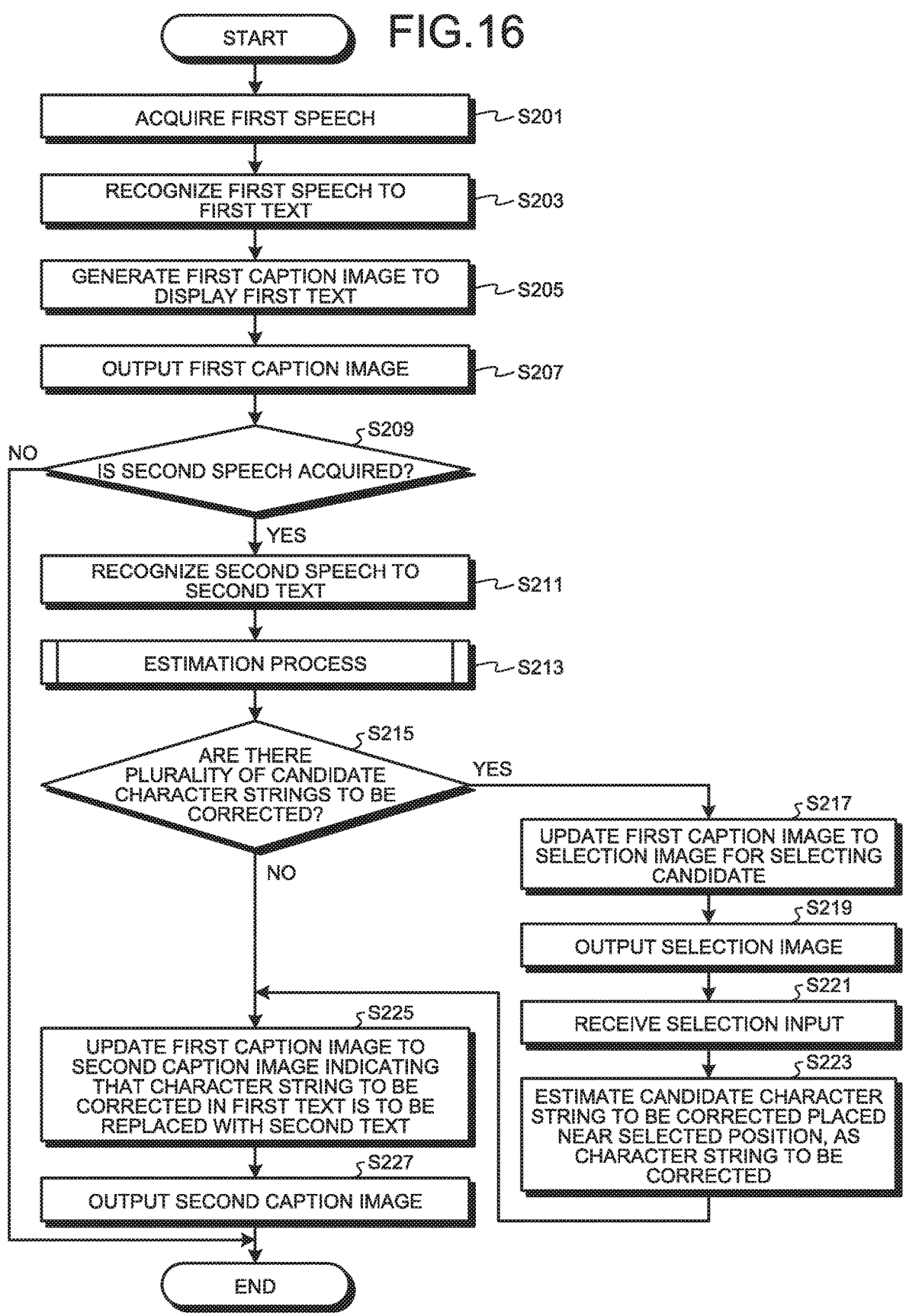
FIG. 16 is a flowchart illustrating a process example of the second embodiment.

FIG. 16 is a flowchart illustrating an example of a processing flow performed by the apparatus for correcting speech recognition error 110 of the second embodiment.

First, the processes from step S201 to step S213 are the same as the processes from step S101 to S113 in the flowchart illustrated in FIG. 6.

Next, when the first text that is converted by the first converter 13 includes a plurality of character strings in which the similarity with the second text that is converted by the second converter 21 is equal to or more than the threshold (Yes at step S215), the estimation unit 123 estimates each of the character strings as the candidate character string to be corrected. The update unit 125 then updates the first caption image that is generated by the generation unit 15 to the selection image (step S217). The selection image is used to cause the corrector to select the candidate character string to be corrected that is to be replaced with the second text, from the candidate character strings to be corrected in the first text The second output unit 127 then outputs the selection image that is updated by the update unit 125 to the terminal device 20-2 (step S219).

The reception unit 129 then receives, from the terminal device 20-2, input (input of position coordinates at the position touched on the selection image) of touching the position on the candidate character string to be corrected or the vicinity position of the candidate character string to be corrected that is to be replaced with the second text, on the selection image, as selection input (step S221).

The estimation unit 123 then estimates the candidate character string to be corrected that is closer to the position touched by the selection input, among the candidate character strings to be corrected, as the character string to be corrected (step S223).

The subsequent processes from steps S225 to S227 are the same as the processes from steps S115 to S117 in the flowchart illustrated in FIG. 6.

At step S215, if the first text that is converted by the first converter 13 includes a single character string in which the similarity with the second text that is converted by the second converter 21 is equal to or more than the threshold (No at step S215), the estimation unit 123 estimates the character string as the character string to be corrected, and proceeds to step S225.

As described above, in the second embodiment, even if the first text includes the character strings that are candidates to be replaced with the second text, it is possible to replace the character string that the corrector intends to replace, with the second text.

In particular, in the second embodiment, the corrector need not correctly select the recognition error portion that is to be corrected (need not strictly specify the starting point and the ending point of the recognition error portion). The corrector only needs to specify the recognition error portion that is to be corrected in an ambiguous manner, by just touching (tapping) the vicinity of the recognition error portion to be corrected or the like. Thus, it is possible to simplify the selection of the recognition error portion, thereby reducing the trouble and cost of the operation.

In the second embodiment, a case in which the candidate character string to be corrected that is to be replaced with the second text is selected by touching (pointing or tapping) is described as an example. However, it is not limited thereto, and for example, the candidate character string to be corrected that is to be replaced with the second text may be selected by tapping and holding.

First Modification

In the second embodiment described above, a case in which the corrector selects the candidate character string to be corrected that is to be replaced with the second text, after the corrector has input the second speech is described as an example. However, it is not limited thereto, and the input of the second speech and the selection of the character string to be replaced with the second text may be carried out substantially simultaneously.

In this case, the corrector may input the second speech, while selecting the character string that is to be replaced with the second text on the first caption image. In other words, the reception unit 129 receives the selection input for selecting the character string that is to be replaced with the second text on the first caption image, at substantially the same time when the second acquisition unit 19 acquires the second speech. In the second embodiment, the reception unit 129 receives, from the terminal device 20-2, input (input of position coordinates at the position touched on the first caption image) of touching the position on the character string or the vicinity position of the character string that is to be replaced with the second text, on the first caption image.

If the first text includes a plurality of character strings in which the similarity with the second text is equal to or more than the threshold, the estimation unit 123 estimates the character string that is selected by the selection input as the character string to be corrected. In the second embodiment, the estimation unit 123 estimates the character string that is closer to the position touched by the selection input, among the character strings in which the similarity with the second text is equal to or more than the threshold, as the character string to be corrected.

As described above, the first modification can obtain the same advantages as those of the second embodiment.

Second Modification

The selection input in the second embodiment described above may be input of selecting the candidate character string to be corrected, by touching the position on the candidate character string to be corrected or the vicinity position of the candidate character string to be corrected that is to be replaced with the second text, on the selection image.

Figure 17:
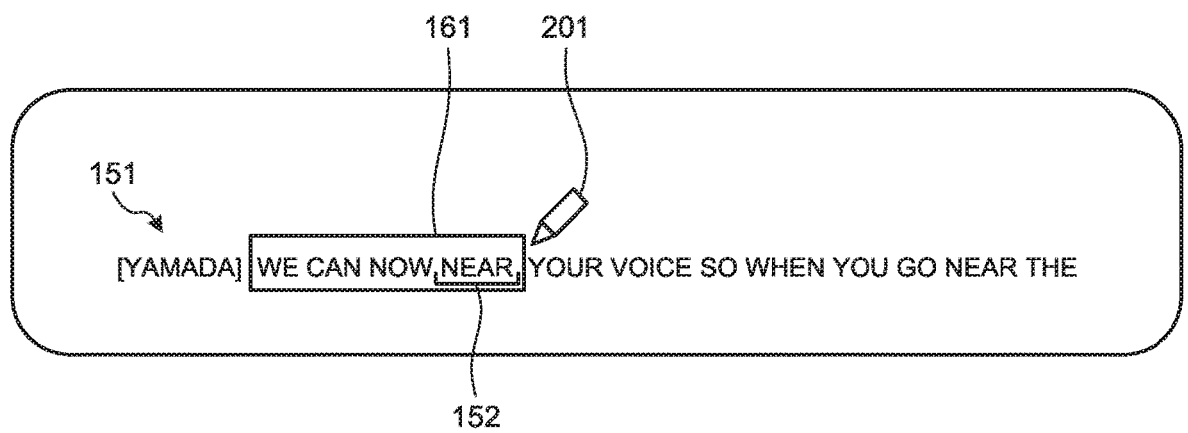
FIG. 17 is an explanatory diagram of an example of selection input in a second modification.
Figure 18:
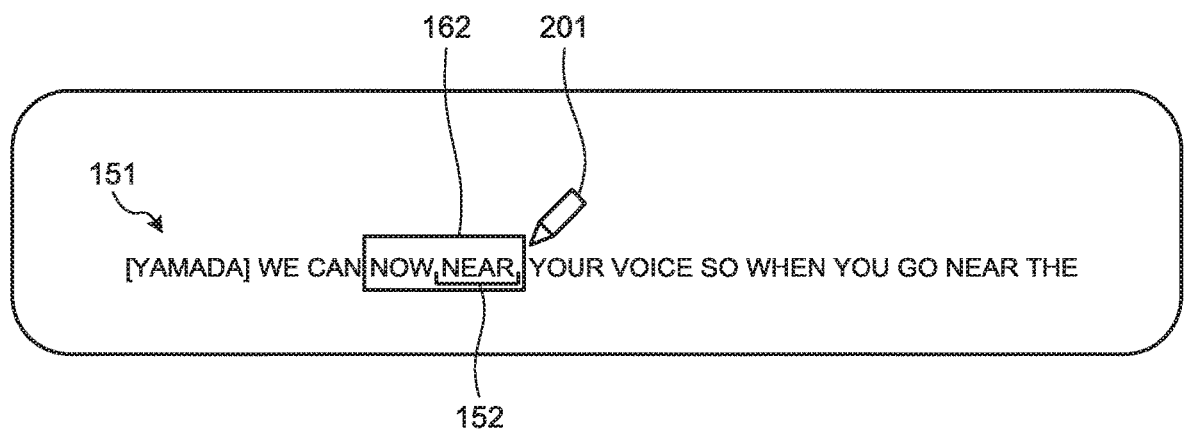
FIG. 18 is an explanatory diagram of an example of the selection input in the second modification.
Figure 19:
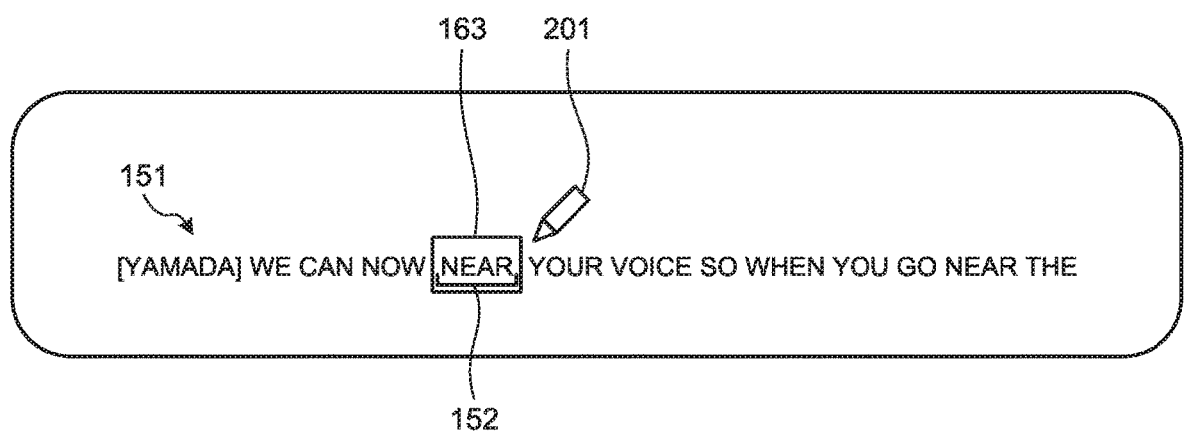
FIG. 19 is an explanatory diagram of an example of the selection input in the second modification.

For example, as illustrated in FIG. 17, when the corrector first touches (points or taps) the vicinity position of the candidate character string to be corrected 152 on the selection image using the touch pen 201, for example, a range 161 is selected. Next, as illustrated in FIG. 18, when the corrector touches (points or taps) the vicinity position of the candidate character string to be corrected 152 again on the selection image using the touch pen 201, for example, a range 162 is selected. Then, as illustrated in FIG. 19, when the corrector touches (points or taps) the vicinity position of the candidate character string to be corrected 152 on the selection image once again using the touch pen 201, for example, a range 163 is selected. Consequently, the candidate character string to be corrected 152 is selected.

In this manner, by repeatedly touching the vicinity position of the candidate character string to be corrected 152, the corrector may select a character string including the candidate character string to be corrected 152 while changing the range. It is also possible to change the range by reducing or enlarging the range on a morpheme basis. It is also possible to replace the candidate character string to be corrected that is included in the selected range with the second text, by changing the selected range by touching, and then double touching (double tapping) the selected range.

Similarly, the selection input in the first modification may be input of selecting a character string by touching the position on the character string or the vicinity position of the character string that is to be replaced with the second text, on the first caption image.

Third Modification

The selection input in the second embodiment may be input of moving the second text to the position on the candidate character string to be corrected or the vicinity position of the candidate character string to be corrected that is to be replaced with the second text. The estimation unit 123 may then estimate the candidate character string to be corrected that is closer to the position where the second text is moved by the selection input, among the candidate character strings to be corrected, as the character string to be corrected.

Figure 20:
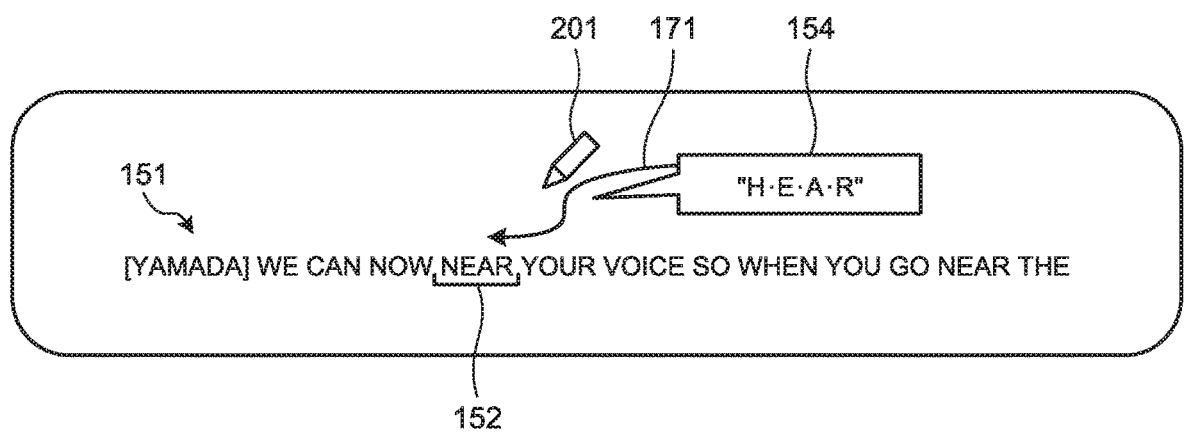
FIG. 20 is an explanatory diagram of an example of selection input in a third modification.

For example, as illustrated in FIG. 20, the reception unit 129 may receive input of dragging and dropping by the corrector the second text 154 toward a direction 171 of the candidate character string to be corrected 152 using the touch pen 201, for example. The estimation unit 123 may then estimate the candidate character string to be corrected 152 being closer to the position where the second text 154 is being dragged and dropped, as the character string to be corrected.

Hardware Configuration

Figure 21:
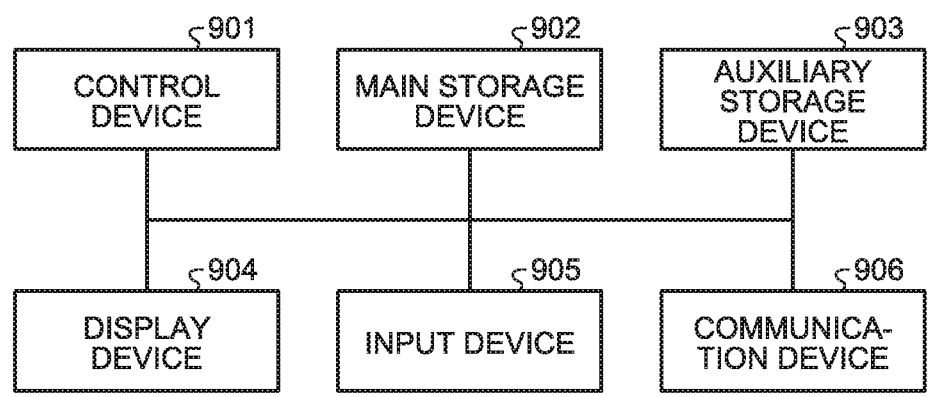
FIG. 21 is a configuration diagram illustrating a hardware configuration example of an apparatus for correcting speech recognition error of the embodiments and the modifications.

FIG. 21 is a configuration diagram illustrating a hardware configuration example of the apparatus for correcting speech recognition error of each of the embodiments and the modifications described above. As illustrated in FIG. 21, the apparatus for correcting speech recognition error of each of the embodiments and the modifications described above includes a control device 901 such as the CPU, a main storage device 902 such as the ROM and the RAM, an auxiliary storage device 903 such as a hard disc drive (HDD) and a solid state drive (SSD), a display device 904 such as a display, an input device 905 such as a mouse and a keyboard, and a communication device 906. The apparatus for correcting speech recognition error of each of the embodiments and the modifications described above can be implemented using a hardware configuration of an ordinary computer.

A computer program to be executed by the apparatus for correcting speech recognition error of each of the embodiments and the modifications described above may be provided by being provided in advance in a ROM and the like.

Furthermore, the computer program to be executed by the apparatus for correcting speech recognition error of each of the embodiments and the modifications described above may be recorded on a computer readable recording medium such as a compact disc-read only memory (CD-ROM), a compact disc-recordable (CD-R), a memory card, a digital versatile disc (DVD), a flexible disk (FD), or the like in an installable or executable file format.

Furthermore, the computer program to be executed by the apparatus for correcting speech recognition error of each of the embodiments and the modifications described above may be stored on a computer that is connected to a network such as the Internet, and causing a user to download the computer program via the network. The computer program to be executed by the apparatus for correcting speech recognition error of each of the embodiments and the modifications described above may be provided or distributed via the network such as the Internet.

The computer program to be executed by the apparatus for correcting speech recognition error of each of the embodiments and the modifications described above has a module structure for implementing each of the units described above on a computer. As actual hardware, for example, the control device 901 reads out the computer program from the auxiliary storage device 903 on the main storage device 902 and executes the computer program so that the above units are implemented on the computer.

As described above, in the embodiments and the modifications described above, it is possible to simplify the correction of the recognition error when the speech uttered by the speaker is recognized and output as a caption.

For example, the steps in the flowcharts in the embodiments described above may be executed by changing the execution order, executed simultaneously, or executed in a different order for each of the embodiments, as long as the execution does not contradict the nature of each step.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for correcting a character string in a text, the apparatus comprising:
   a hardware processor electrically coupled to a memory, and configured to:
      acquire a first audio of a first speech of a first speaker;
      convert the first audio to a first text;
      output a first caption image of the first text;
      acquire a second audio of a second speech of a second speaker for correcting a character string that is included in the first text;
      convert the second audio to a second text;
      search the first text for one or more similar blocks that are similar to the second text, wherein each block of the one or more similar blocks comprises at least a portion of a character string that matches the second text;

calculate, for each of the one or more similar blocks, a measure of text similarity between the similar block and the second text;

calculate, for each of the one or more similar blocks, a measure of acoustic similarity by performing acoustic matching between comparison sections of the first audio corresponding to the one or more similar blocks and the second audio;

determine an estimated similarity for each of the one or more similar blocks by at least combining the measure of text similarity and the measure of acoustic similarity in a comparison section that corresponds to the similar block;

determine that a character string in a similar block of the one or more similar blocks is the character string to be corrected, wherein the estimated similarity associated with the similar block is equal to or more than a threshold; and output a second caption image indicating the first text, the second text, and a position of the character string to be corrected in the first text, and indicating that the character string to be corrected is to be replaced with the second text.

2. The apparatus according to claim 1, wherein
when the first text includes a plurality of character strings in which the similarity with the second text is equal to or more than the threshold, the hardware processor estimates each of the character strings as a candidate character string to be corrected; and the hardware processor outputs a selection image for causing the second speaker to select, from the candidate character strings to be corrected in the first text, the candidate character string to be corrected that is to be replaced with the second text, and wherein the hardware processor is further configured to receive selection input of selecting the candidate character string to be corrected that is to be replaced with the second text in the selection image, wherein the hardware processor estimates the candidate character string to be corrected that is selected from among the candidate character strings to be corrected by the selection input as the character string to be corrected; and the hardware processor outputs the second caption image indicating that the character string to be corrected in the first text is to be replaced with the second text.

3. The apparatus according to claim 2, wherein
the selection input corresponds to a touch input of touching a position on the candidate character string to be corrected or a vicinity position of the candidate character string to be corrected that is to be replaced with the second text on the selection image, and the hardware processor estimates the candidate character string to be corrected, from among the candidate character strings to be corrected, that is closer to the position touched by the selection input as the character string to be corrected.

4. The apparatus according to claim 2, wherein the selection input corresponds to a touch input of selecting the candidate character string to be corrected, by touching a position on the candidate character string to be corrected or a vicinity position of the candidate character string to be corrected that is to be replaced with the second text, on the selection image.

5. The apparatus according to claim 2, wherein
the selection input is input of moving the second text to a position on the candidate character string to be corrected or a vicinity position of the candidate character string to be corrected that is to be replaced with the second text, and the hardware processor estimates the candidate character string to be corrected, among the candidate character strings to be corrected, that is closer to the position to which the second text is moved by the selection input as the character string to be corrected.

6. The apparatus according to claim 1, wherein
the hardware processor is further configured to receive selection input of selecting the character string that is to be replaced with the second text on the first caption image, and the hardware processor estimates the character string selected by the selection input as the character string to be corrected when the first text includes a plurality of character strings in which the similarity with the second text is equal to or more than the threshold.

7. The apparatus according to claim 5, wherein
the selection input corresponds to a touch input of touching a position on the character string or a vicinity position of the character string that is to be replaced with the second text on the first caption image, and the hardware processor estimates the character string that is closer to the position touched by the selection input, among the character strings in which the similarity with the second text is equal to or more than the threshold, as the character string to be corrected.

8. The apparatus according to claim 5, wherein the selection input corresponds to a touch input of selecting the character string by touching a position on the character string or a vicinity position of the character string that is to be replaced with the second text on the first caption image.

9. The apparatus according to claim 1, wherein the second speech is shorter than the first speech.

10. A method for correcting a character string in a text, the method comprising:

acquiring a first audio of a first speech of a first speaker;
converting the first audio to a first text;
outputting a first caption image of the first text;
acquiring a second audio of a second speech of a second speaker for correcting a character string that is included in the first text;
converting the second audio to a second text;
searching the first text for one or more similar blocks that are similar to the second text, wherein each block of the one or more similar blocks comprises at least a portion of a character string that matches the second text;
calculating, for each of the one or more similar blocks, a measure of text similarity between the similar block and the second text;
calculating, for each of the one or more similar blocks, a measure of acoustic similarity by performing acoustic matching between comparison sections of the first audio corresponding to the one or more similar blocks and the second audio;
determining an estimated similarity for each of the one or more similar blocks by at least combining the measure of text similarity and the measure of acoustic similarity in a comparison section that corresponds to the similar block;
determine that a character string in a similar block of the one or more similar blocks is the character string to be corrected, wherein the estimated similarity associated with the similar block is equal to or more than a threshold; and outputting a second caption image indicating the first text, the second text, and a position of the character string to be corrected in the first text, and indicating that the character string to be corrected is to be replaced with the second text.

11. A computer program product having a non-transitory computer readable medium including programmed instructions that cause a computer to execute:
  acquiring a first audio of a first speech of a first speaker;
  converting the first audio to a first text;
  outputting a first caption image of the first text;
  acquiring a second audio of a second speech of a second speaker for correcting a character string that is included in the first speech;
  converting the second audio to a second text;
  searching the first text for one or more similar blocks that are similar to the second text, wherein each block of the one or more similar blocks comprises at least a portion of a character string that matches or is close to the second text;
  calculating, for each of the one or more similar blocks, a measure of text similarity between the similar block and the second text;
  calculating, for each of the one or more similar blocks, a measure of acoustic similarity by performing acoustic matching between comparison sections of the first audio corresponding to the one or more similar blocks and the second audio;
  determining an estimated similarity for each of the one or more similar blocks by at least combining the measure of text similarity and the measure of acoustic similarity in a comparison section that corresponds to the similar block;
  determining that a character string in a similar block of the one or more similar blocks is the character string to be corrected, wherein the estimated similarity associated with the similar block is equal to or more than a threshold; and
  outputting a second caption image indicating the first text, the second text, and a position of the character string to be corrected in the first text, and indicating that the character string to be corrected is to be replaced with the second text.

* * * * *